(12) United States Patent
Buckett

(10) Patent No.: US 7,150,826 B2
(45) Date of Patent: Dec. 19, 2006

(54) FILTERING APPARATUS

(75) Inventor: Jonathan Buckett, Bromsgrove (GB)

(73) Assignees: Copa Limited (GB); United Utilities PLC (GB)

( * ) Notice: Subject to any disclaimer, the term of this patent is extended or adjusted under 35 U.S.C. 154(b) by 330 days.

(21) Appl. No.: 10/489,474

(22) PCT Filed: Sep. 10, 2002

(86) PCT No.: PCT/GB02/04106

§ 371 (c)(1),
(2), (4) Date: Jul. 29, 2004

(87) PCT Pub. No.: WO03/022399

PCT Pub. Date: Mar. 20, 2003

(65) Prior Publication Data

US 2004/0262204 A1    Dec. 30, 2004

(30) Foreign Application Priority Data

Sep. 12, 2001    (GB)    ................... 0122074.8

(51) Int. Cl.
*B01D 33/00* (2006.01)
*B01D 33/23* (2006.01)
(52) U.S. Cl. ............... 210/161; 210/404; 210/456; 162/327; 162/357
(58) Field of Classification Search .......... 210/161, 210/404, 456; 162/327, 357
See application file for complete search history.

(56) References Cited

U.S. PATENT DOCUMENTS 1,088,303 A * 2/1914 Spencer, Jr. ............... 210/157
4,680,115 A * 7/1987 LaValley .................... 210/247
5,330,646 A   7/1994 Frykhult
5,958,231 A * 9/1999 Sacherer et al. ............ 210/247

FOREIGN PATENT DOCUMENTS

GB    2 279 889 A    1/1995
GB    2 309 398 A    7/1997
WO    WO 96 27422 A    9/1996

* cited by examiner

*Primary Examiner*—Terry K. Cecil
(74) *Attorney, Agent, or Firm*—Michael Best & Friedrich LLP

(57) ABSTRACT

A liquid filtering apparatus for mounting in a housing and positioned to filter liquid flowing from an inlet (23) to a drain. A rotatable wheel is disposed within and coupled to a rotating screen so that rotation of the wheel causes rotation of the screen. The wheel includes vanes (5–12) extending towards the screen dividing the space within the screen into sections substantially isolated from each other except via the drain. A stationary baffle (13) arranged adjacent a portion of the screen prevents liquid from flowing into the wheel through that screen portion. The baffle is positioned such that water flows more readily into sections of the wheel on one side of a vertical plane through the rotation axis than the other sections. Thus, the wheel is unbalanced by water retained in sections of the wheel and rotation of the wheel results.

11 Claims, 5 Drawing Sheets

FILTERING APPARATUS

The present invention relates to a liquid filtering apparatus, and in particular to such an apparatus which is capable of filtering a liquid such as water to remove solids.

Rotating drum screens are known for removing solid waste material from flows of, for example, water. Such screens are generally used for removing floating debris such as leaves or small pieces of wood from river water at the intake to industrial plant, although some rotating screens have been installed in fish farms to prevent small fish being lost at the overflow of ponds. In a rotating drum screen, a perforated cylindrical drum is supported in a channel so as to rotate about a horizontal axis, the drum being partially submerged in water flowing through the channel. Water enters the interior of the perforated drum and exits from one end of the drum through a simple circular opening in a sidewall of the channel in which the drum is supported. The drum is arranged such that the water flow causes the drum to rotate.

The rotation of the drum causes any solid matter in the main watercourse which becomes temporarily attached to the outside surface of the drum to be washed off. In one known arrangement, the flow of water beneath the drum assists in causing its rotation in a manner equivalent to a conventional undershot water wheel but further torque is applied to the drum as a result of the positioning of an impeller in the end of the drum from which water issues and the provision of helical vanes on the interior of the drum. Water entering the drum flows axially towards one end of the drum and in so doing interacts with the vanes and impeller to cause the drum to rotate.

The known rotating drum screens are particularly advantageous in that they do not require an external power source. The screen does not blind, and there is no need for regular maintenance. As a result the known rotating drum screens have proved successful in circumstances where there is a continuous relatively high volume flow of relatively clean water.

One of the problems confronted by the water industry is that of handling storm water overflows from sewerage systems. In some circumstances, in the event of very heavy rain, surface water enters sewerage systems and mixes with the wastewater being transported to a treatment plant. The combined flow of wastewater and rainwater can be greater than the maximum flow which can be carried by the sewerage system. To accommodate such temporary conditions, it is conventional practice to provide overflow chambers in sewerage systems to temporarily store excess flows. Unfortunately, unless such chambers are very large indeed, in exceptional weather conditions raw sewage can overflow from such chambers into, for example, surface waterways. In circumstances where overflows are likely to occur, for example in periods of exceptionally heavy rain, it is usually arranged that any wastewater which does escape from a sewerage system will be very rapidly diluted and therefore not lead to major problems. It is not acceptable, however, if any overflow from a sewerage system results in solid materials reaching surface watercourses.

In addressing the above problem, and also the problem of finding an efficient mechanism for dealing with primary separation of liquid from solids in sewage treatment works, the possibility of using a conventional rotating drum screen was considered. It was found, however, that the conventional rotating drum screens were not adequate because when the screens are only rotated on fairly rare occasions, for example in the event of flooding, the relatively low torque generated by axial flow along the vanes within the drum was insufficient to reliably start the rotation of the drum. Furthermore, given the nature of the solid material included in flows of sewage it was difficult to avoid the screens becoming clogged with solid material without providing some additional cleaning of the screen surface and this required more power than that which was available from the conventional rotating drum screen assembly.

This problem has been addressed in published patent specification no. WO-A-96/27422 wherein a permeable screen defining a cylindrical body partly submerged in the liquid to be filtered is described. The apparatus is driven by the weight of water disposed within chambers of the body. Inlet water is filtered into a higher level chamber with a lower chamber being drained by a side-drain. Thus the weight of water in the higher level chamber provides the driving torque. However, it was found, as a result of the relationship between the liquid inlet and drain from the cylindrical body, that the apparatus could only process a small amount of water and at low water flow did not function at all.

It is an object of the present invention to obviate or mitigate the problems outlined above.

According to the present invention, there is provided a liquid filtering apparatus for mounting in a housing defining an inlet and a drain, the liquid filtering apparatus being positioned in use to filter liquid flowing from the inlet to the drain, the apparatus comprising a permeable screen rotatable about a substantially horizontal axis and forming a barrier between the inlet and the drain, a rotatable wheel disposed within the screen and coupled to the screen so that rotation of the wheel causes rotation of the screen, the wheel defining vanes extending towards the screen to divide a space around which the screen is arranged into sections which are substantially isolated from each other except via the drain, and a stationary baffle arranged adjacent a portion of the screen to prevent liquid from flowing into the wheel through that portion of the screen, the baffle being positioned such that water flows more readily into sections of the wheel on one side of a vertical plane through the rotation axis than the other sections, whereby the wheel is unbalanced by water retained in sections of the wheel so as to cause the wheel to rotate.

Thus, the rotatable screen is rotated by a force generated by the weight of liquid in one or more sections of the wheel, the water being retained by the wheel so as to maximise the applied torque.

It has been found that an apparatus in accordance with the present invention is able to rotate quickly and reliably even at relatively low water flow rates. These characteristics mean that an apparatus in accordance with the invention is not only more efficient at low water flow but is also able to process a larger amount of water than in prior art arrangements.

The apparatus may include a plate formed so as to obstruct communication between the drain and upper sections of the wheel into which water can flow readily.

The baffle may be disposed between the screen and wheel. The baffle may extend around a lower portion and one side of the wheel. The baffle may extend around more than 180° relative to the rotational axis, one edge of the baffle being located above the rotation axis and the other edge being located to one side of the rotation axis. The baffle may extend from a point vertically above the axis to a point horizontally spaced from the axis.

The vanes may extend radially from a shaft, which defines the rotational axis of the wheel. Alternatively the vanes may be swept back relative to the direction of the rotation of the wheel. The shaft may extend between bearings mounted on opposite walls of a chamber.

Drains are may be formed in one or both walls of the chamber.

The apparatus of the invention may be mounted in the manner of a cantilever from one wall of a chamber.

Embodiments of the present invention will now be described, by way of example, with reference to the accompanying drawings, in which.

Figure 1:
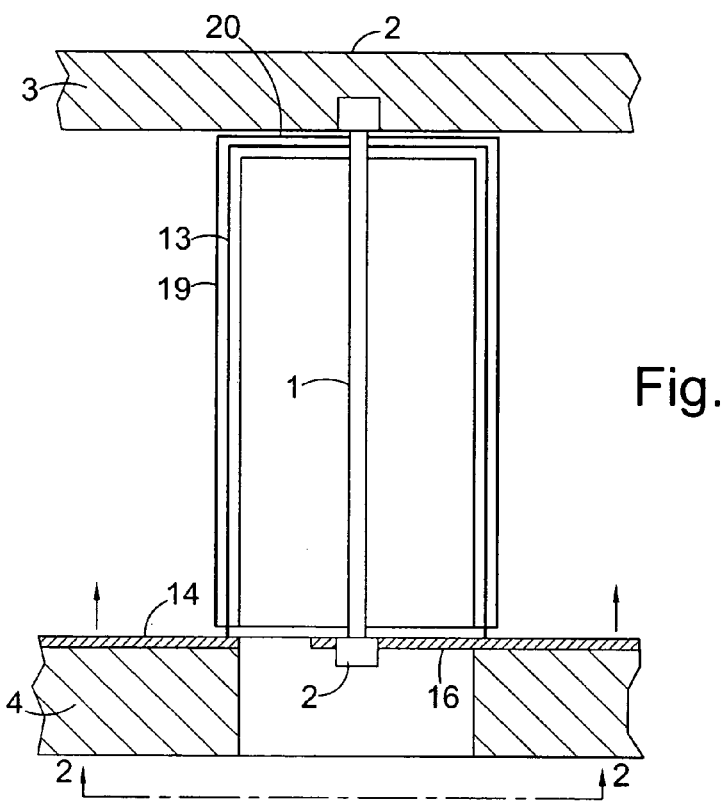
FIG. 1 is a schematic horizontal cross-sectional view of a first embodiment of the present invention.
Figure 2:
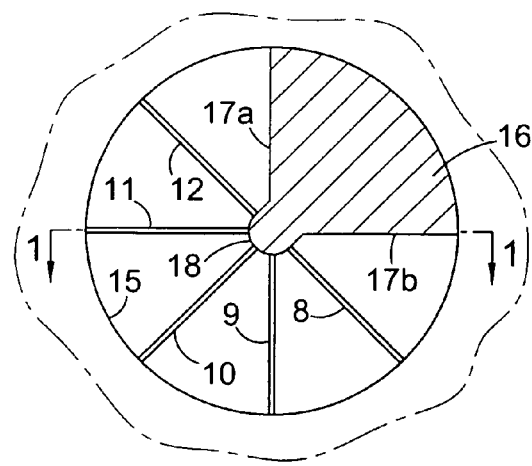
FIG. 2 is a view on the lines 2—2 of FIG. 1, the cross-sectional view of FIG. 1 being taken on the lines 1—1 of FIG. 2.
Figure 3:
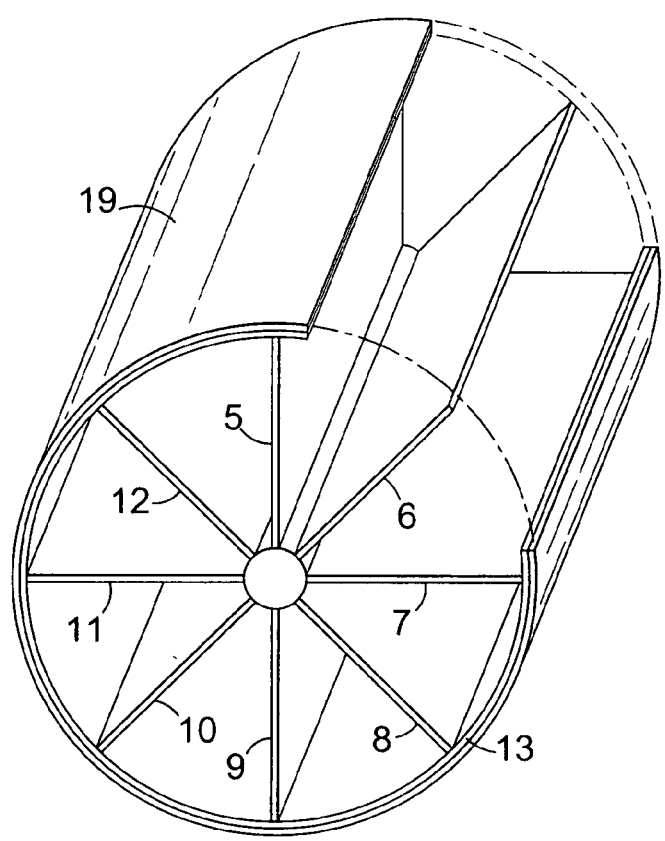
FIG. 3 is an end perspective view of components of the embodiment shown in FIG. 1.

Referring to FIGS. 1 to 3, the illustrated embodiment comprises a shaft 1 journalled in bearings 2 which are mounted in concrete walls 3 and 4. The shaft 1 supports eight planar vanes 5, 6, 7, 8, 9, 10, 11 and 12 which rotate with the shaft 1.

A baffle 13 extends through 270° around the rotation axis of the shaft 1. The end of the baffle 13 adjacent the wall 3 is closed by a circular plate which is supported by but does not rotate with the shaft 1. The other end of the baffle is supported on a plate 14 in which an aperture is formed which is of the same shape and is in register with a circular aperture formed in the wall 4. As shown in FIG. 2, that circular aperture has an edge 15 which extends through 360° around the axis of the shaft 1. An extension 16 of the plate 14 (which preferably comprises stainless steel) forms a barrier within the edge 15 extending 90° around the shaft 1 from a point on edge 15 vertically above the shaft 1 to a point on edge 15 horizontally spaced from the shaft 1. The barrier 16 has inner edges 17a (vertically extending) and 17b (horizontally extending). The inner edges 17a and 17b are connected by a further edge 18 which extends around a portion of the barrier 16 which provides support for the bearing 2. It will be appreciated that an alternative means of support for bearing 2 could be provided.

A cylindrical screen 19 extends from a circular end plate 20 which is mounted on the shaft 1 so as to rotate with the shaft. The other end of the screen 19 is mounted by means not shown to enable the screen to rotate relative to the plate 14.

The vanes 5 to 12 extend towards the screen 19. (In FIG. 3 part of the screen 19 is shown in broken lines to indicate the periphery of the screen 19 so that the vanes may be seen more clearly. The barrier 16 is also omitted from FIG. 3 for clarity). The radially outer edges of the vanes extend to adjacent the radially inner surface of the baffle 13 such that a space around which the screen 19 extends is divided into eight sections which are substantially isolated from each other except at the end of the assembly adjacent the wall 4. Thus the shaft 1, the vanes supported by the shaft and the screen 19 define a wheel rotatable as a single unit, the baffle 13 being interposed between the radially outer edges of the vanes and the screen 19.

The opening defined by edges 15,17a, 17b and 18 shown in FIG. 2 represents a drain through which water retained by the wheel on either side of the vanes 8, 9, 10, 11 and 12 can flow to, for example, a water course. Any section of the wheel defined between two vanes which are both located at positions between the edges 17a and 17b of FIG. 2 will be retained in that section by the barrier 16 unless the wheel rotates until at least one of the vanes has passed the edge 17b.

Figure 4:
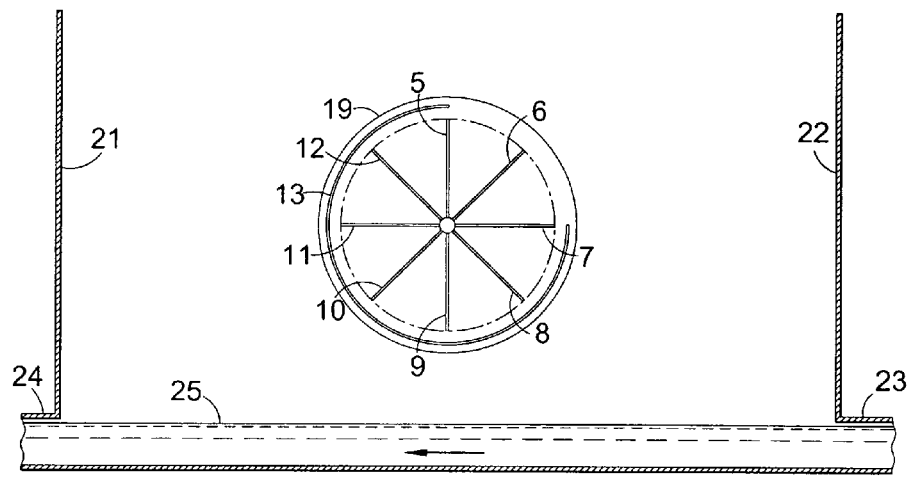
FIGS. 4, 5, 6 and 7 are end views of components of the embodiment of FIG. 1 illustrating the operation of the embodiment.
Figure 5:
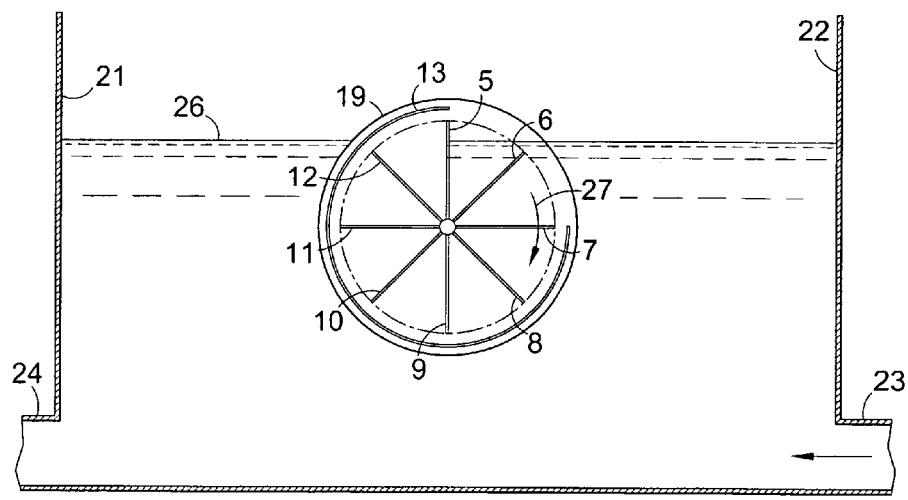
Figure 6:
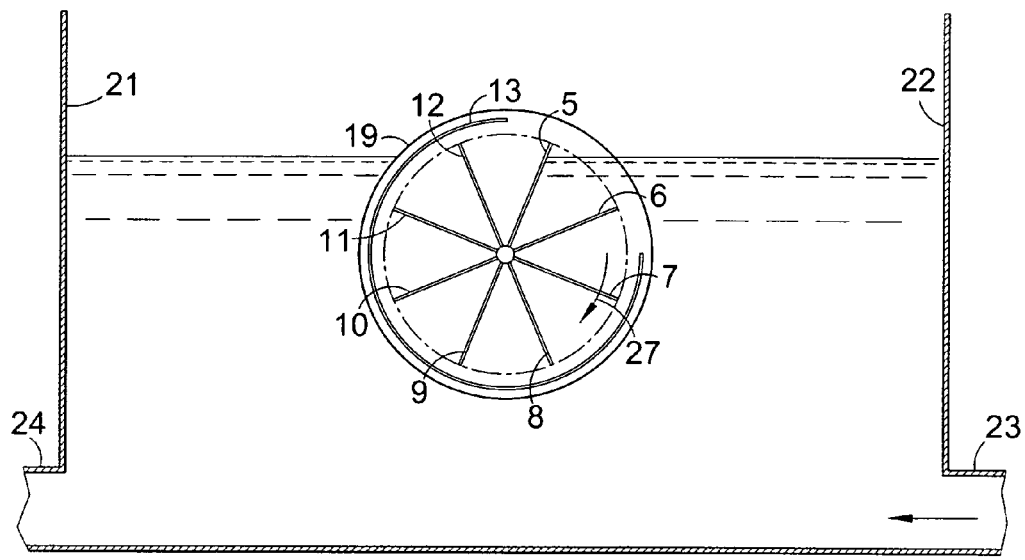
Figure 7:
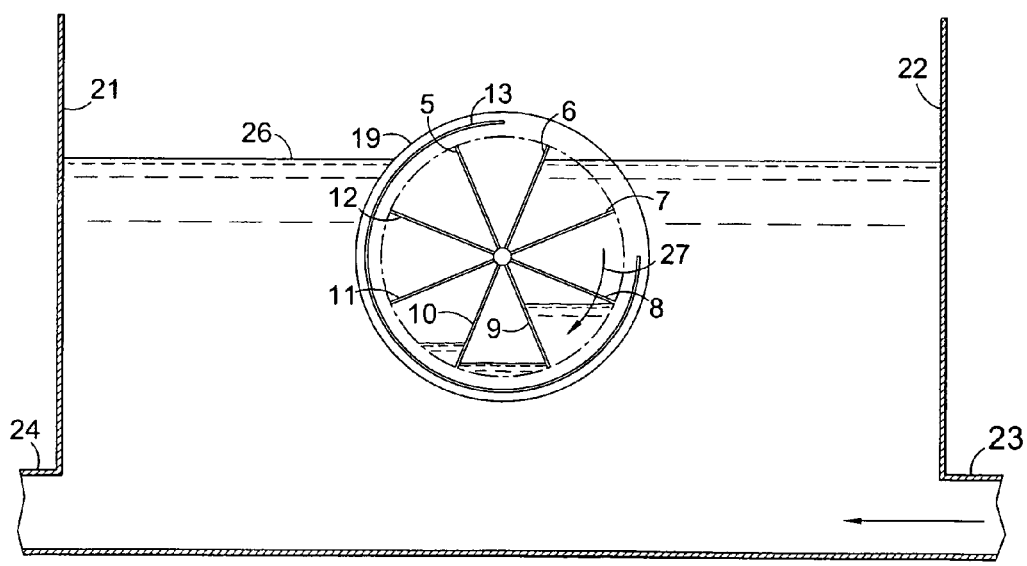

Referring to FIGS. 4 to 7, these Figures illustrate the operation of the device illustrated in FIGS. 1 to 3. The assembly is mounted between two end walls 21 and 22 which extend between the sidewalls 3 and 4 of FIG. 1. The chamber defined by the four walls 3, 4, 21 and 22 extends upwards from a channel having an inlet 23 and an outlet 24. In normal conditions, contaminated water such as sewage enters the chamber through inlet 23 and exits through outlet 24, the upper surface of the water being represented by line 25. The screen 19 is located at a sufficient height such that in normal conditions it is well above the water surface 25. This is represented in FIG. 4.

In storm conditions, for example after periods of very heavy rain, the water flow through the inlet 23 may be greater than the capacity of the outlet 24 to discharge the inflow of water from the chamber. In such circumstances the water level 25 may rise to the position indicated in FIGS. 5, 6 and 7 by line 26. Water flows through all portions of the screen 19 immersed below the level 26 but can only enter the wheel sections between vanes 5 and 6 and between vanes 6 and 7 because of the presence of the baffle 13. Some minor leakage of water may occur into the remaining sections of the wheel but such water will be rapidly discharged through the opening shown in FIG. 2. As a result, the wheel is unbalanced and the weight of water retained between vanes 5, 6 and 7 applies a torque to the wheel in the direction indicated by arrow 27. This causes the wheel to rotate from the position shown in FIG. 5 towards the position shown in FIG. 6. In that position, water is still retained between vanes 5 and 6 but can begin to flow out of the wheel section defined between vanes 6 and 7. Water continues to flow into the section between vanes 5, 6 and 7 until the vane 6 passes the edge of the baffle 13 which is at the same vertical height as the axis of the shaft 1. Water then flows into the section between vanes 5 and 12. When the wheel has turned through almost 360° it will assume the position the position shown in FIG. 7. Water flows from the mutually isolated sections of the wheel which are in communication with the opening shown in FIG. 2 such that in the position of the wheel shown in FIG. 7 substantially all of the water has been discharged from the section defined between vanes 5 and 12. As soon as the radially outer edge of the vane 6 becomes immersed in the water below water level 26 the cycle is repeated.

Subject to any minor leakage, all of the water which is discharged through the drain has had to pass through the screen 19. Any solids retained by the screen are washed from the outer surface of the screen as a result of the relatively rapid motion of the screen relative to the water within the chamber. As soon as the water level subsides to a level below the edge of the baffle 13 which is at the same vertical height as the rotation axis of the wheel no further water can enter the wheel and therefore it comes to halt.

Figure 8:
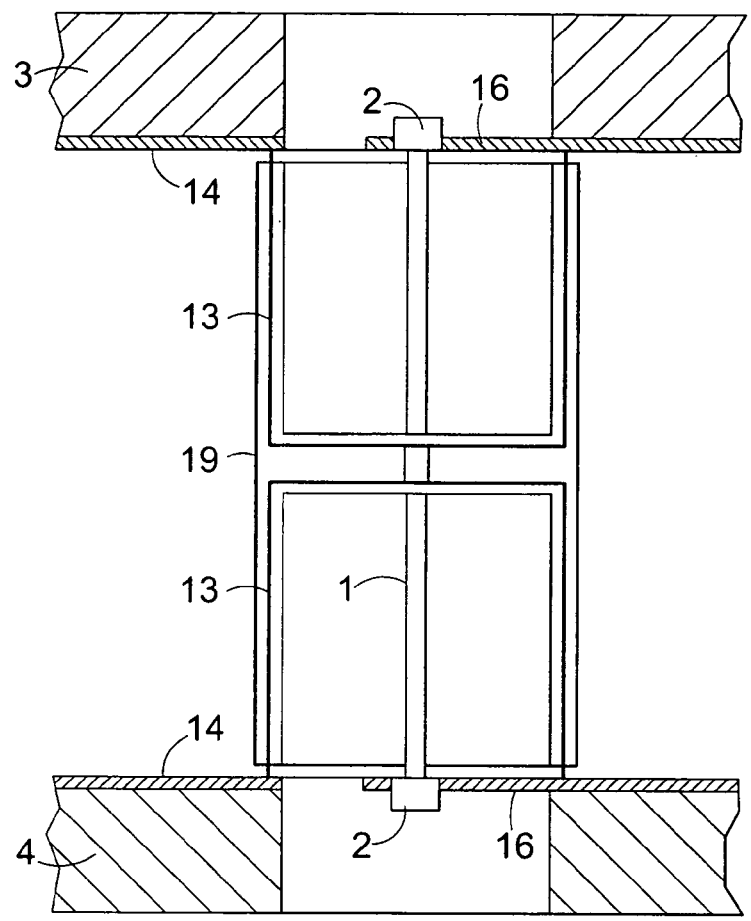
FIG. 8 is a schematic cross-sectional view similar to that of FIG. 1 but of a second embodiment of the present invention.

In the embodiment of the invention illustrated in FIG. 1 to 7, only one end of the wheel opens into a drain opening. A double-ended embodiment of the invention is possible however as illustrated in FIG. 8. The same reference numerals are used in FIG. 8 as are used for like components of the embodiment of FIGS. 1 to 7. The embodiment illustrated in FIG. 8 comprises a single screen 19 but supports two separate baffles 13, each baffle 13 being supported by but not rotating with the shaft 1. The baffles 13 thus divide the assembly of FIG. 8 into two sections, one communicating with an opening in wall 3 and the other communicating with an opening in wall 4.

Figure 9:
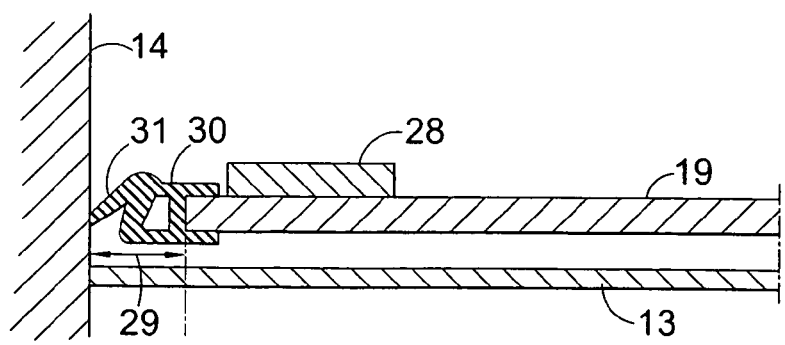
FIG. 9 illustrates a sealing arrangement which may be provided at one end of the embodiment of FIG. 1.

In the embodiments of the invention illustrated in FIGS. 1 and 8 the screen 19 is shown as defining an annular gap between itself and the plate or plates 14. Either this gap must be small to prevent significant leakage between the screen 19 and plate 14, or the gap must be closed by a seal. FIG. 9 illustrates one possible sealing arrangement.

Referring to FIG. 9, the baffle 13 is shown extending from plate 14. The screen 19 rotates outside the baffle 13. The end of the screen 19 adjacent the plate 14 is strengthened by an annular ring 28 which is positioned at a distance of for example 12 mm from the end of the screen 19, the end of the screen 19 being spaced from the plate by a gap the dimension of which is indicted by arrow 29. The gap is closed by a polymeric seal 30 which is fitted onto the end of the screen 19 and defines a flexible lip 31 which runs against the plate 14. This prevents any significant leakage between the end of the screen 19 and the plate 14.

Embodiments of the invention could be envisaged in which, rather than interposing a baffle between a rotating screen and a rotating vane assembly, the baffle is located outside the screen. For example, a baffle extending from an upper edge vertically above the wheel shaft to a lower edge vertically below the wheel shaft would ensure that water would only enter sections of the wheel located on one side of a vertical plane through the shaft axis. Solid material retained on the outer surface of the screen could in such an embodiment be swept off that outer surface by for example brushes extending radially inwards from the upper and lower edges of the baffle. As with the embodiments of FIGS. 1 to 7 and FIG. 8, the baffle would still ensure that water would enter the wheel in a manner in which would unbalance the wheel.

In the embodiment of FIGS. 1 to 7, the baffle extends through 270° around the wheel axis and the plate 16 retains water within the wheel sections between the remaining 90° of the circumference of the wheel. It will be appreciated that the baffle could extend around the shaft through an angle of more or less 270°, there being a trade off as between the maximum surface area of the screen which can exposed to the water flow (90° in the case of the embodiment of FIGS. 1 to 7), the rate at which water can be discharged into the drain or drains, and the magnitude of the torque applied to the wheel as a result of the imbalance caused by the different weights of water retained by different sections of the wheel. The angular extent of the baffle and the angular extent of the plate 16 may also be adjusted as appropriate to suit particular applications.

In the illustrated embodiment of the invention, the vanes extend radially from the wheel shaft. Other configurations are possible. For example the vanes may be swept back in the direction of rotation of the wheel to smooth the torque applied to the wheel. A swept back vane arrangement is described in the prior art assembly described in the above mentioned patent specification WO-A-96-27422.

Although in the described embodiments of the invention the filtering apparatus is mounted on a shaft extending between two opposed walls of a chamber, other arrangements are possible. For example, the apparatus may be mounted over an opening in one wall of the chamber, the apparatus projecting from that wall in the manner of cantilever.

The invention claimed is:

1. A liquid filtering apparatus for mounting in a housing defining an inlet and a drain, the liquid filtering apparatus being positioned in use to filter liquid flowing from the inlet to the drain, the apparatus comprising a permeable screen rotatable about a substantially horizontal axis and forming a barrier between the inlet and the drain, a rotatable wheel disposed within the screen and coupled to the screen so that rotation of the wheel causes rotation of the screen, the wheel defining vanes extending towards the screen to divide a space around which the screen is arranged into sections which are substantially isolated from each other except via the drain, and a stationary baffle arranged adjacent a portion of the screen to prevent liquid from flowing into the wheel through that portion of the screen, the baffle being positioned such that water flows more readily into sections of the wheel on one side of a vertical plane through the rotation axis than the other sections, whereby the wheel is unbalanced by water retained in sections of the wheel so as to cause the wheel to rotate.

2. An apparatus according to claim 1, wherein the housing is formed so as to obstruct communication between the drain and upper sections of the wheel, into which water can flow readily.

3. An apparatus according to claim 2, wherein the baffle is disposed between the screen and wheel.

4. An apparatus according to claim 3, wherein the baffle extends around a lower portion and one side of the wheel.

5. An apparatus according to claim 4, wherein the baffle extends around more than 180° relative to the rotational axis, one edge of the baffle being located above the rotation axis and the other edge being located to one side of the rotation axis.

6. An apparatus according to claim 5, wherein the baffle extends from a point vertically above the axis to a point horizontally spaced from the axis.

7. An apparatus according to claim 1, wherein the vanes extend radially from a shaft, which defines the rotational axis of the wheel.

8. An apparatus according to claim 1, wherein the vanes are swept back relative to the direction of the rotation of the wheel.

9. An apparatus according to claim 1, wherein a shaft extends between bearings mounted on opposite walls of a chamber.

10. An apparatus according to claim 9, wherein drains are formed in both walls of the chamber.

11. An apparatus according to claim 1, wherein the apparatus is mounted in the manner of a cantilever from one wall of a chamber.

* * * * *